(12) United States Patent
Blacklidge et al.

(10) Patent No.: US 9,212,264 B2
(45) Date of Patent: Dec. 15, 2015

(54) ASPHALT COMPOSITION CONTAINING GROUND TIRE RUBBER

(71) Applicant: Blacklidge Emulsions, Inc., Gulfport, MS (US)

(72) Inventors: Roy Brittany Blacklidge, Gulfport, MS (US); Codrin Daranga, Gulfport, MS (US); Scott Watson, Ocean Springs, MS (US); Sonia Serna, Biloxi, MS (US); Joseph McKay, Pass Christian, MS (US)

(73) Assignee: BLACKLIDGE EMULSIONS, INC., Gulfport, MS (US)

( * ) Notice: Subject to any disclaimer, the term of this patent is extended or adjusted under 35 U.S.C. 154(b) by 0 days.

(21) Appl. No.: 13/705,067

(22) Filed: Dec. 4, 2012

(65) Prior Publication Data

US 2013/0143985 A1    Jun. 6, 2013

Related U.S. Application Data

(60) Provisional application No. 61/566,673, filed on Dec. 4, 2011.

(51) Int. Cl.
| | | |
|---|---|---|
| *C08J 3/20* | (2006.01) | |
| *E01C 7/26* | (2006.01) | |
| *C08J 3/00* | (2006.01) | |
| *C08L 95/00* | (2006.01) | |

(52) U.S. Cl.
CPC .. *C08J 3/20* (2013.01); *C08J 3/005* (2013.01); *C08L 95/00* (2013.01); *E01C 7/265* (2013.01); *C08J 2395/00* (2013.01); *C08J 2419/00* (2013.01); *C08K 2201/00* (2013.01)

(58) Field of Classification Search
CPC .......... C08J 3/005; C08J 2419/00; C08J 3/20; C08L 95/00; C08K 2201/00; E01C 7/265
USPC .......................................................... 524/68
See application file for complete search history.

(56) References Cited

U.S. PATENT DOCUMENTS 4,609,696 A * 9/1986 Wilkes ............................ 524/59
5,034,060 A * 7/1991 Schilling et al. ............. 106/277

OTHER PUBLICATIONS

MaxxChem, Kohere Anti-strip Asphalt Additive Product Listing, Mar. 2015.*

* cited by examiner

*Primary Examiner* — Randy Gulakowski
*Assistant Examiner* — Christopher M Rodd
(74) *Attorney, Agent, or Firm* — Butler Snow, LLP

(57) ABSTRACT

We disclose a method of making an asphalt composition containing large quantities of ground tire rubber. Over 20% GTR by weight can be used in the asphalt composition without the GTR settling out. The method comprises a series of heating and blending and using a GTR stabilizer.

9 Claims, No Drawings

ASPHALT COMPOSITION CONTAINING GROUND TIRE RUBBER

CROSS-REFERENCES TO RELATED APPLICATIONS

This application claims the benefit of U.S. Provisional Application No. 61/566,673, filed Dec. 4, 2011. Each application is incorporated herein by reference in entirety.

FIELD OF THE INVENTION

The present invention is generally directed toward an asphalt composition containing ground tire rubber, hereinafter referred to as "GTR". In a second aspect, the present invention is directed to methods for producing a modified asphalt containing ground tire rubber.

BACKGROUND OF THE INVENTION

Asphalt blended with ground tire rubber (also known as crumb rubber, or recycled tire rubber) has been used extensively and has been previously described. The addition of the rubber to asphalt allows for improved performance of roads or other paved surfaces due to resistance to rutting, cracking and deformation. Furthermore, the addition of ground tire rubber can reduce road noise. Not only does the rubber improve the performance of the asphalt, it allows old tires to be recycled into a useful substance instead of piling up in tire dumps.

However, the previously known methods of blending GTR with asphalt suffered from a problem with the settling of rubber particles out of the blend. As a result, the GTR was not sufficiently distributed within the asphalt composition, thus requiring continuous agitation. The currently disclosed invention, however, provides for a method of suspending GTR in an asphalt composition such that settling of the GTR is reduced or eliminated for a period of at least 48 hours following agitation.

SUMMARY OF THE INVENTION

An improved method for suspending GTR in asphalt is disclosed. The method allows GTR to be used without the GTR particles settling out of the asphalt blend. The GTR will remain suspended in the asphalt and will not settle for at least 48 hours in the absence of mechanical agitation. In a second aspect, an asphalt composition containing ground rubber is disclosed. In a third aspect of the invention, a pavement structure containing GTR is disclosed.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The methods disclosed herein allow one to produce an asphalt composition that contains a stabilized GTR content. The process comprises the following steps.

First, the GTR is blended with an asphalt bitumen at a high temperature, preferably in a blender that includes an agitator and heating coils. Although any size of GTR particles may be used, in a preferred embodiment, 40 mesh GTR is used. It should be appreciated that finer ground tire rubber particle sizes may also be used. Using the methods disclosed herein, concentrations of GTR can be increased such that even at 20% GTR by weight, the GTR does not settle out. It is possible that even larger quantities of GTR may be added, but resulting composition becomes very viscous and difficult to handle.

Any grade of asphalt that would be used for a paving application could be used in the composition. The asphalt is added to the blend unit such that the heating coils are covered with asphalt. The temperature of the asphalt should be sufficiently high to allow it to be blended with the GTR, or approximately 300 to 400 degrees Fahrenheit, but preferably in the range of 350 to 380 degrees Fahrenheit.

Next, a GTR stabilizer is added in amounts from 0.1% to 10% by weight of the GTR and asphalt blend. In a preferred embodiment, between 1% and 3% by weight of the GTR and asphalt blend is used. The stabilizer may be any chemical composition that allows the GTR particles to remain suspended in the blend.

Although the GTR stabilizer may stabilize the GTR using any means, one such mechanism of operation is by creating a shear thinning (thixotropic) media that would prevent or slow down the settling of GTR in the absence of shear, due to its high viscosity. Alternatively, the GTR stabilizer could help anchor the GTR particles in the asphalt media similar to how a micelle is anchored in the water phase of an emulsion. Although any commercially available GTR stabilizer may be used, in a preferred embodiment, the GTR stabilizer is KOMAXX brand stabilizer available from Starbinder, defined as a composition comprising a blend of oil, approximately 5-15% diethylenetriamine (DETA), and sodium hydroxide, wherein a 1% solution in water has a pH of 11.

The GTR stabilizer is added and allowed to react under agitation. In one embodiment, this reaction may require 2 to 4 hours, but, of course, factors such as quantity of components, temperature, viscosity, and agitation speed will affect the reaction time. The efficiency of the reaction may also be improved by the addition of chemical promoters or catalysts.

Once the GTR has been stabilized, the asphalt composition containing the GTR may be used to create a pavement using traditional paving techniques.

Working Embodiments.

EXAMPLE 1

GTR and paving grade asphalt are blended at high temperature (300 to 400° F., preferably 350 to 380° F.). To the resulting blend, GTR stabilizer is added and allowed to react under agitation, typically 3 to 4 hours. At the end of this period the GTR material is stabilized. The amount of stabilizer added varies from 1.5% to 2.5% by weight of the GTR and Asphalt blend. In some cases, depending on the chemical composition of the base asphalt used, there is a pre-treatment step before the stabilizer is added. This step consists of a chemical promoter with the purpose of increasing the speed and efficiency of the stabilization reaction.

PG 67-22 asphalt was added to the blend unit such that the coils are covered with asphalt. In this embodiment, 81,880 pounds of asphalt were used. Next, the blend unit agitator is turned on and heated to 355 degrees +/−5 degrees Fahrenheit. Once asphalt is at 355.degree. F. +/−5 degrees, 8,280 pounds of GTR (Liberty 40 Mesh) is added to the asphalt. The mixture is then blended at 355.degree. F. +/−5 degrees for 3 hours. After 3 hours of mixing, 1,840 pounds of Komaxx, comprising a blend of oil, approximately 5-15% diethylenetriamine (DETA), and sodium hydroxide, wherein a 1% solution in water has a pH of 11, is added (2.0% by weight). After the Komaxx has been added, the mixture is blended at 355.degree. F. +/−5degrees for 3hours. Finally, the samples are pulled. An analysis of the mixtures shows that all of the GTR remains stable in the mixture and does not settle out when analyzed according to ASTM 7173, herein incorporated by reference. This is verified by obtaining 4.degree. F. or less of difference between the ring and ball softening point of the top and bottom samples of the test tube as conducted according to ASTM 7173.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A method for making an asphalt composition containing ground tire rubber comprising the steps of:
   a. heating asphalt;
   b. blending ground tire rubber with asphalt to form an asphalt and ground tire rubber blend; and
   c. adding ground tire rubber stabilizer to the asphalt and ground tire rubber blend,
   wherein said ground tire rubber stabilizer comprises a blend of oil, approximately 5-15% diethylenetriamine (DETA) and sodium hydroxide, wherein a 1% solution of said ground tire rubber stabilizer in water has a pH of 11, that allows ground tire rubber particles to remain suspended in the asphalt and ground tire rubber blend.

2. The method of claim 1 wherein said asphalt is heated between 300 and 400 degrees Fahrenheit.

3. The method of claim 1 wherein the ground tire rubber has a particle size of between 30 and 140 mesh.

4. The method of claim 1 wherein final concentration of ground tire rubber is in the range of 1% to 20% by weight.

5. The method of claim 1 wherein the concentration of ground tire rubber stabilizer is in the range of 1% to 3% by weight.

6. An asphalt composition containing suspended ground tire rubber comprising:
   a. asphalt;
   b. 1% to 20% ground tire rubber by weight; and
   c. ground tire rubber stabilizer, wherein the ground tire rubber stabilizer comprises a blend of oil, approximately 5-15% diethylenetriamine (DETA), and sodium hydroxide, wherein a 1% solution of said ground tire rubber stabilizer in water has a pH of 11.

7. The asphalt composition of claim 6 wherein the concentration of ground tire rubber stabilizer is between 0.1% and 10% by weight.

8. The asphalt composition of claim 6 further comprising an additive to facilitate the action of the ground tire rubber stabilizer.

9. A pavement structure comprising:
   a. asphalt;
   b. ground tire rubber stabilizer, wherein the ground tire rubber stabilizer comprises a blend of oil, approximately 5-15% diethylenetriamine (DETA), and sodium hydroxide, wherein a 1solution of said ground tire rubber stabilizer in water has a pH of 11; and
   c. ground tire rubber in the range of 5% to 20% by weight.

* * * * *